(12) United States Patent
Karlov et al.

(10) Patent No.: US 8,681,983 B2
(45) Date of Patent: Mar. 25, 2014

(54) METHOD FOR PUBLIC-KEY ATTRIBUTE-BASED ENCRYPTION WITH RESPECT TO A CONJUNCTIVE LOGICAL EXPRESSION

(75) Inventors: Alexandre Karlov, Meyrin (CH); Pascal Junod, Vufflens-la-Ville (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 112 days.

(21) Appl. No.: 13/510,530

(22) PCT Filed: Nov. 19, 2010

(86) PCT No.: PCT/EP2010/067817
§ 371 (c)(1),
(2), (4) Date: May 17, 2012

(87) PCT Pub. No.: WO2011/061285
PCT Pub. Date: May 26, 2011

(65) Prior Publication Data
US 2012/0224692 A1    Sep. 6, 2012

Related U.S. Application Data

(60) Provisional application No. 61/262,602, filed on Nov. 19, 2009.

(51) Int. Cl.
*H04K 1/00* (2006.01)

(52) U.S. Cl.
USPC ............................... 380/255; 380/42; 380/37

(58) Field of Classification Search
USPC .......................... 380/255, 28–30, 41, 44, 372
See application file for complete search history.

(56) References Cited

FOREIGN PATENT DOCUMENTS

EP    2068489 A1    6/2009

OTHER PUBLICATIONS

"PCT/EP2010/067817 Search Report and Written Opinion, mailed Mar. 28, 2011", 11 pgs.
Attrapadung, Nuttapong, et al., "Conjunctive Broadcast and Attribute-Based Encryption", Pairing 2009, LNCS 5671, (2009), pp. 248-265.
Boneh, Dan, et al., "Collusion Resistant Broadcast Encryption with Short Ciphertexts and Private Keys", Crypto 2005, LNCS 3621, (2005), pp. 258-275.
Barreto, Paulo, et al., "Efficient Algorithms for Pairing-Based Cryptosystems", CRYPTO 2002, 22nd Annual International Cryptology Conference, (2002), 354-369.
Bethencourt, J, et al., "Ciphertext-policy attribute-based encryption", IEEE Symposium on Security and Privacy (SP'07), (2007), 14 pgs.
Fiat, Amos, et al., "Broadcast encryption", Advances in Cryptology—CRYPTO'93, Lecture Notes in Computer Science, vol. 773/1994, (1994), 480-491.
Lubicz, David, et al., "Attribute-based broadcast encryption scheme made efficient", Lecture Notes in Computer Science, 2008, vol. 5023, Progress in Cryptology—AFRICACRYPT 2008, (2008), 325-342.

(Continued)

*Primary Examiner* — Nirav B Patel
(74) *Attorney, Agent, or Firm* — Schwegman Lundberg & Woessner, P.A.

(57) ABSTRACT

The aim of the present invention is to propose a method for providing attribute-based encryption for conjunctive normal form (CNF) expressions, the said CNF expression comprising at least one clause over a set of attributes, the said method using a key generation engine, an encryption engine and a decryption engine.

12 Claims, 1 Drawing Sheet

(56) References Cited

OTHER PUBLICATIONS

Miller, Victor S, "Short program for functions on curves", Exploratory Computer Science. IBM, Thomas J. Watson Research Center, Unpublished Manuscript. Retrieved from the Internet: <URL: http://crypto.stanford.edu/miller/miller.pdf, (Accessed May 30, 2012), 1-7.

Sahai, A, et al., "Fuzzy identity-based encryption", 24th Annual International Conference on the Theory and Applications of Cryptographic Techniques, Aarhus Denmark., (2005), 457-473.

Waters, Brent, "Ciphertext-Policy Attribute-Based Encryption: An Expressive, Efficient, and Provably Secure Realization", University of Texas at Austin, Unpublished Manuscript. Retrieved from the Internet: <URL: http://eprint.iacr.org/2008/290.pdf>, (Accessed May 30, 2012), 30 pgs.

METHOD FOR PUBLIC-KEY ATTRIBUTE-BASED ENCRYPTION WITH RESPECT TO A CONJUNCTIVE LOGICAL EXPRESSION

RELATED APPLICATIONS

This application is a U.S. National Stage Filing under 35 U.S.C. 371 from International Patent Application Serial No. PCT/EP2010/067817, filed Nov. 19, 2010, and published on May 26, 2011 as WO 2011/061285A1, which claims the priority benefit of U.S. Provisional Application Ser. No. 61/262,602, filed Nov. 19, 2009, the contents of which are incorporated herein by reference in their entirety.

FIELD OF THE INVENTION

This invention refers to the field of broadcast encryption, in particular the way to manage authorization rights to access the content described by a logical expression in a broadcast system having a management center and a plurality of receiving devices which have certain characteristics.

INTRODUCTION

The area of broadcast encryption is well known in the art and was discussed for the first time by Fiat and Naor [1]. In this setting, the broadcasting center can send an encrypted message to a set of privileged (i.e., non-revoked) users which is a subset of the set of all possible receivers. Sometimes these terminals can be arranged according to some natural characteristics or attributes like their ZIP code based geographical location, their subscription to certain packages or their software version. Intuitively the broadcaster would like to broadcast to receivers which satisfy some of these properties in a more or less complex manner. For instance the broadcaster may want to enforce the access policy by sending the content only to receivers which are in (("New York") OR ("New Jersey")) AND (with a receiver's firmware not older than 2.1.1). It should be emphasized that in this scenario, the broadcaster does not know the receivers identities and broadcasts to a subsets of receivers according to a logical expression based on their characteristics contrary to the standard broadcast encryption model, where the center broadcasts to a specific subset of receivers by specifying explicitly their identities.

PRIOR ART

The notion of attribute-based encryption (ABE) where the center broadcasts to a subset of receivers in terms of descriptive attributes was introduced by Sahai and Waters in [2]. There are two types of ABE, namely: key-policy ABE where the access policy (also called the access structure) is specified in the private key and ciphertext-policy ABE where the access policy is specified in the ciphertext. Bethencourt, Sahai and Waters proposed the first construction of a ciphertext-policy ABE in [3]. Current invention concerns only ciphertext-policy ABE schemes, which will be further referenced simply as ABE schemes.

Those skilled in the art would agree that a logical access policy can be expressed using AND, OR and NOT logical gates. These expressions can be generalized under two forms, namely the disjunctive normal form (DNF) and the conjunctive normal form (CNF). The CNF is the conjunction (in other words a logical AND) of clauses, where a clause is a disjunction (in other words a logical OR) of attributes. The DNF is the disjunction (a logical OR) of conjunctions (a logical AND) of attributes. The NOT gate can be only part of a single attribute. For a set of attributes $A_1, A_2, K, A_n$, an example of a CNF expression would be: $(A_1 \vee A_2 \vee A_3) \wedge (A_4 \vee A_5 \vee \neg A_6) \wedge K \wedge (A_{n-2} \vee \neg A_{n-1} \vee \neg A_n)$ and an example of a DNF expression would be: $(A_1 \wedge \neg A_2 \neg \wedge A_3) \vee (\neg A_4 \wedge A_5 \wedge A_6) \vee K \vee (A_{n-2} \wedge A_{n-1} \wedge \neg A_n)$. In the two examples above the symbol $\wedge$ represents a logical AND, and the symbol $\vee$ represents a logical OR.

An important notion is the one of a monotonic logical expression. The expression is called monotonic if it can be defined as a composition of logical ANDs and ORs, but without any NOTs.

It should be noted that the prior art describes ABE schemes, methods and systems which operate with DNF types of logical expressions, most of the them being monotonic and restricted to a certain fixed number of clauses or attributes per such expression. For instance, recently, such methods were disclosed in [4], [5] and [6].

Those skilled in the art would notice that the crucial property of an ABE scheme is the so-called attribute-collusion resistance property. This is represented by the fact that provided two decryption keys $dk_{u_1}$ and $dk_{u_2}$ for attributes $A_1$ and $A_2$ respectively, such that the key $dk_{u_1}$ is not able to decrypt any ciphertext intended solely for $A_2$ and vice-versa, these keys can not be used in any way in order to decrypt a cryptogram described by an expression $A_1 \wedge A_2$.

Problem to be Solved

The aim of the present invention is to address CNF types of logical expressions for ABE. The benefit of the present application is hence the possibility to efficiently perform ciphertext-policy ABE for CNF expressions with logical ANDs and ORs, as well as logical NOTs.

BRIEF DESCRIPTION OF THE INVENTION

The aim is achieved thanks to a method for providing attribute-based encryption for conjunctive normal form (CNF) expressions, the said CNF expression consisting of at least one clause over a set of attributes, the said method consisting of a key generation engine, an encryption engine and a decryption engine, and comprising the steps of:

Generating by the key generation engine a random $g \in G$, where $G$ is a prime order group of order $p$, four random values $\alpha, \gamma, \beta, r \in_R Z/pZ$, and for $i=1, 2, K, n, n+2, K, 2n$ computing by the key generation engine $2n$ values $g_i = g^{\alpha^i} \in G$ and $v = g^\gamma \in G$.

Generating by the encryption engine the encryption key $PK = (g^r, g_1^r, K, g_n^r, g_{n+2}^r, K, g_{2n}^r, v^r, g_n^\beta, g_n)$ consisting of $2n+2$ group elements, $n$ being the number expressing the size of the attribute set. For the abovementioned CNF expression over a set of attributes, CNF expression consisting of N clauses, generating by the encryption engine N random values $t_1, t_2, K, t_N \in_R Z/pZ$, computing by the encryption engine the value $$t = \sum_{i=1}^{N} t_i \bmod p,$$

generating by the encryption engine the cryptogram $hdr = (g_n^t, hdr_1, K, hdr_N)$ consisting of $2N+1$ group elements with $$hdr_i = \left(g^{rt_i}, \left(v^r \prod_{j \in \beta_i} g_{n+1-j}^r\right)^{t_i}\right)$$

for each clause $\beta_i$ in the abovementioned CNF expression and generating the session key SK as $SK = e(g_1^r, g_n^\beta)^t = e(g, g)^{\beta r \alpha^{(n+1)} t}$, wherein the said session key or parts thereof is used to derive a symmetric key to encrypt the message, or to encrypt the message with the said session key. Generating by the key generation engine a plurality of private decryption keys $dk_u = (g_1^{r(\beta+s_u)}, g_1^{s_u}, K, g_n^{s_u}, g_{n+2}^{s_u}, K, g_{2n}^{s_u}, d_{i_1}, K, d_{i_N}, d_{j_1}, K, d_{j_R})$ each of the said decryption keys explicitly associated with at least one positive attribute by the mean of the group element $d_{i_j} = g_{i_j}^{\gamma \cdot s_u}$ and explicitly associated with at least one negative attribute by the means of the group element $d_{j_k} = g_{j_k}^{\gamma \cdot s_u}$ wherein the value $s_u$ is a random group element and is unique for every decryption key.

BRIEF DESCRIPTION OF THE FIGURE

The method of the invention will be better understood thanks to the attached figures in which:

the FIG. 1 illustrates a broadcaster and a plurality of receivers the FIG. 2 illustrate a management center in communication with a plurality of receivers.

DETAILED DESCRIPTION OF THE INVENTION

Figure 1:
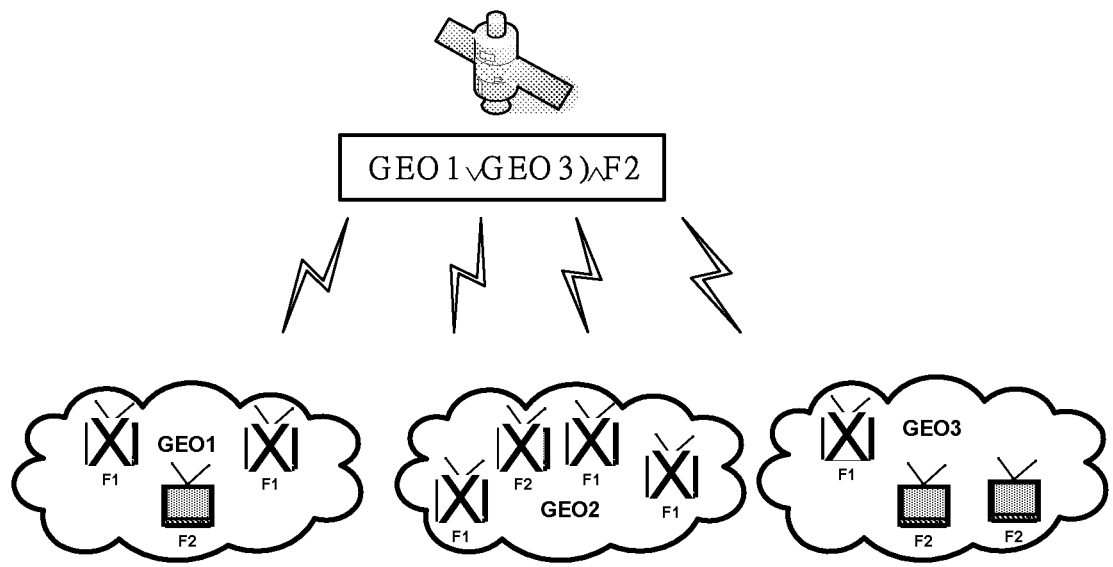

The present invention relates to cryptographic systems and methods and provides an attribute collusion-resistant ciphertext-policy attribute-based encryption scheme for conjunctive normal form (CNF) expressions.

Bilinear Maps

The present invention relies on bilinear maps (also called pairings in the related art). Let G and $G_T$ be two cyclic groups of prime order p and a generator $g \in G$. Let $e: G \times G \to G_T$ be a non-degenerate bilinear map such that for all $x, y \in G$ and $a, b \in Z/pZ$, we have $e(x^a, y^b) = e(x, y)^{ab}$ and $e(g, g) \neq 1$. The function $e(.,.)$ should be also efficiently computable. For example, such maps can be, for instance, Weil or Tate pairings on supersingular elliptic curves. Their usage and implementation is well-known in the art. Weil and Tate pairings are provided here as examples and for the purpose of the preferred embodiment and it should be noted that any admissible pairing function $e(.,.)$ with the above properties can be used. The preferred method involved in the computation of such a function will be the so-called Miller's algorithm for pairing calculation which is well known in the related art [7].

Choice of the Parameters

In the preferred embodiment we are using a supersingular elliptic curve $E(F_p)$ with $p \equiv 3 \pmod 4$ a prime number of at least 512 bits and the order of $E(F_p) = p + 1$. The group of point on the elliptic curve $E(F_p)$ should also have a subgroup of prime order q of at least 160 bits. The sizes of these parameters correspond to the (block cipher) security equivalent of 80 bits. The generation of such elliptic curves is well known in the related art. Hence the following map is defined based on the Tate pairing function: $E[q] \times E'(F_p) \to F_{p^2}^*$, where $E'(F_p)$ is defined to be the twisted curve and $E[q]$ is the group of q-torsion points on E. Such parameters selection allows us to use a lightweight version of the Miller's algorithm along with arithmetic operations performed mostly in $F_p$, which is much faster, contrary to traditional methods of using arithmetic in $F_{p^k}$. In fact, these methods are also well-known in the art and are disclosed in details in [8]. It should be noted that in this case the group G is represented by the q-torsion subgroup of $E(F_p)$ and has the prime order q.

Preferred Implementation of the Scheme

According to the preferred embodiment of the current invention we consider a system where receivers can be arranger according to some characteristics or attributes, such as geographical position, firmware version, etc. Let n be the total number of such characteristics or attributes and $\lambda$ be the total number of receivers. Hence for the sake of the preferred embodiment we can name these characteristics with n literals $A_1, A_2, K, A_n$. The preferred implementation of the current invention includes three randomized algorithms, namely KeyGen, Encrypt and Decrypt implemented on a computer or in a dedicated apparatus. It should be also noted that in the below preferred implementation we will use an additive group law notation which is also frequently used in the art.

KeyGen algorithm starts by generating a random point $G \in E[q]$ by any well known mean of the art, as well as four random values $\alpha, \gamma, \beta, r \in_R Z/qZ$. Then for $i = 1, 2, K, n, n+2, K, 2n$ the algorithm computes $2n-1$ values $G_i = \alpha^i G$ and $V = \gamma G$. The algorithm then generates a public encryption key $PK = (rG, rG_1, K, rG_n, rG_{n+2}, K, rG_{2n}, rV, \beta G_n, G_n)$ consisting of $2n+2$ points in the group $E[q]$. The algorithm will also generate a plurality of individual private decryption keys for each of $\lambda$ receivers as follows. First the algorithm generates by any known mean of the art a random value $s_u \in Z/qZ$. Then, for $i = 1, 2, K, n, n+2, K, 2n$ it sets $2n-1$ values $s_u G_1, K, s_u G_n, s_u G_{n+2}, K, s_u G_{2n}$ and computes the value $r(\beta + s_u) G_n$. Finally, for every defined property among $A_1, A_2, K, A_n$ which characterizes the receiver, the algorithm computes N+R values $D_{i_1}, K, D_{i_N}, D_{j_1}, K, D_{j_R}$ where $D_{i_j} = \gamma \cdot s_u G_{i_j}$ and $D_{j_k} = \gamma \cdot s_u G_{j_k}$. Hence the decryption key for an individual receiver, characterized by N+R properties among n, consists of $2n+N+R$ group elements (or in the case of the preferred embodiment—points on the elliptic curve $E(F_p)$), that is $dk_u = (r(\beta + s_u) G_1, s_u G_1, K, s_u G_n, s_u G_{n+2}, K, s_u G_{2n}, D_{i_1}, K, D_{i_N}, D_{j_1}, K, D_{j_R})$. The said individual decryption key is loaded into the receiver, preferably by loading the said key into the secure and tamper-resistant non-volatile memory using methods known in the corresponding art.

Encryption algorithm is provided with an expression in CNF of the form $\beta_1 \wedge \beta_2 \wedge K \wedge \beta_N$, wherein every clause $\beta_i$ consists of a disjunction (logical ORs) of several attributes. First, the algorithm randomly generates N values $t_1, K, t_N \in Z/qZ$ by any well known mean of the art and computes the value $$t = \sum_{i=1}^{N} t_i \bmod q.$$

The encryption algorithm also computes the value $hdr_0 = t \cdot G_n$. The algorithm then computes for every clause $\beta_i$ a pair of values, namely $hdr_{i,0} = t_i rG$ and $$hdr_{i,1} = t_i \left(rV + \prod_{j \in \beta_i} rG_{n+1-j}\right).$$

It should be noted that the value j corresponds to an attribute in the clause $\beta_i$. The said pair of values constitutes the i-th part of the cryptogram. After computing N-th such pair (for the last clause $\beta_N$), the encryption algorithm computes the session key $SK = e(r \cdot G_1, \beta \cdot G_n)^t = e(G, G)^{\beta r \alpha^{(n+1)} t}$. The resulting session key hence has a size of 1024 bits with the parameters of the preferred embodiment. The said session key is then hashed, in the context of the preferred embodiment, using the SHA-256 hash function known in the art. The resulting 128 less significant bits are used as the key for the AES algorithm in encryption mode, the said algorithm also well-known in the art, to encrypt video, audio or other useful messages. Finally, the encryption algorithm outputs the generated cryptogram hdr=(hdr$_0$,hdr$_{i,0}$,hdr$_{i,1}$,K,hdr$_{N,0}$,hdr$_{N,1}$). It should be noted, that the CNF expression is broadcasted along with the cryptogram and the useful message which is encrypted by mean of the session key above to the intended recipients.

Decryption algorithm, upon receiving the cryptogram hdr= (hdr$_0$,hdr$_{i,0}$,hdr$_{i,1}$,K,hdr$_{N,0}$,hdr$_{N,1}$), the corresponding expression in CNF and the useful encrypted message, examines the expression and determines whether or not the receiver fulfils the necessary conditions for decrypting the message. In the case where it does fulfil the necessary conditions, the decryption algorithm proceeds as follow. First, for every clause in the expression it computes the values $$SK_i^{S_u} = \frac{e(S_u \cdot G_k, hdr_{i,1})}{e\left(D_k + \sum_{j \in \beta_i, j \neq k} S_u \cdot G_{n+1-j+k}, hdr_{i,0}\right)},$$

where the values $D_k$ are bonded to the characterizing attributes of the receiver, the said attributes being also listed in the clause $\beta_i$. Each of such N computations is performed using two pairing function described above. After computing N such values $SK_1^{S_u}$, K, $SK_N^{S_u}$, the decryption algorithm computes the session key as $$SK = \frac{e(hdr_0, r(\beta + S_u) \cdot G_1)}{\prod_{i=1}^{N} SK_i^{S_u}}.$$

The said session key is then hashed, in the context of this preferred embodiment, using the SHA-256 hash function and the resulting 128 less significant bits are used as the key for the AES algorithm in decryption mode to decrypt the useful message.

The person skilled in the art would appreciate the fact that the encryption key is public, any party can use it to encrypt any useful contents with respect to any CNF expression and that the said encryption key can not be used to derive the session key or decrypt the useful message without fulfilling a given CNF expression by explicitly possessing the decryption keys corresponding to the said expression. Those familiar with the art would also appreciate the fact that the proposed method fulfils the attribute collusion-resistance property described above. Contrary to the existing schemes of the art, the present invention can support expressions of any number of clauses and attributes without any constraints. Also, the size of the header is linear in the number of clauses and does not depend on the number of the attributes in any clause or in the whole expression.

It is important to note that the use of the particular supersingular elliptic curve over the finite field of a given size, its prime order subgroup, the specific bilinear map function as defined above, its parameters, key sizes, the use of the SHA-256 hash function and AES encryption algorithm is solely defined for the purpose of the preferred embodiment of the present invention and is not, in any case, limiting. Any elliptic curve, or any other group where the bilinear map can be efficiently and securely computed for a given security parameter can be used for the purpose of the present invention. The useful message, such as (but not limited to) video or audio content, can be encrypted or scrambled by any cryptographically secure means using key or keys derived from the session key defined in the scope of the present invention.

The above broadcast encryption scheme can be used to transmit messages from a control center to a plurality of terminals. These messages contain initialization data pertaining to one terminal.

Figure 2:
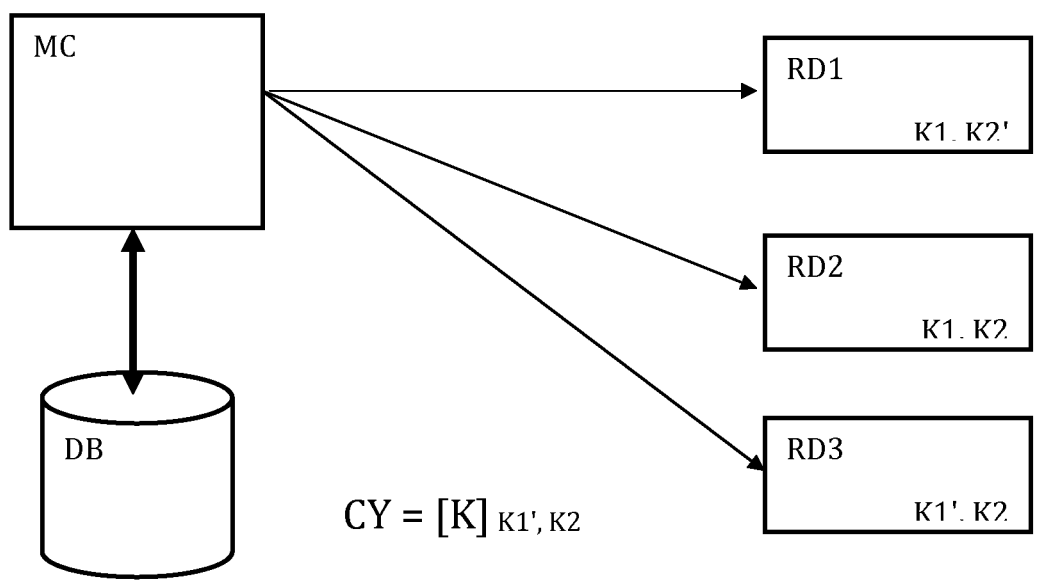

In the FIG. 2, the management center MC stores in its database DB a copy of the key materials sent in the receiving devices RD1, RD2, RD3. According to our example, two subscription packages B1, B2 have been defined, the first one being related to the positive key material K1 and the negative material K1', the second one being related to the positive key material K2 and the negative material K2'.

The receiving device RD1 being entitled to the subscription package B1 has received the key material K1. Due to the fact that this receiving device RD1 is not entitled to the subscription package B2, the key material K2' was also sent to it.

The receiving device RD2 being entitled to the subscription package B1 and B2, both key material K1 and K2 were sent to this device.

The receiving device RD2 being entitled to the Subscription package B2, the key material K2 was sent to it. Due to the fact that this receiving device RD3 is not entitled to the Subscription package B1, the key material K1' was also sent to it.

In case that the management center MC needs to transmit an access key K to only the receiving devices allowed to the second Subscription package B2 and not allowed to the first Subscription package B1, the cryptogram CY sent to the receiving devices RD will contain the access key combined with the negative key material K1' and the positive key material K2.

In the authorization message containing the cryptogram, another field into the message contains a descriptor of the keys to be used for the decryption. This can be in the form of two bitmap, each active bits defining a subscription package, and one bitmap for the positive keys and the other one for the negative keys. According to the implementation of the invention, it could decided that the positive keys are used first to decrypt the cryptogram and then the negative keys.

The product key can release a single broadcast product, e.g. a film or can release a service for a day or a month.

The subscription package can refer to a plurality of services or a single service. The invention thus allows to define the access rule of this product by combining the access to the channel 3 (first subscription package) and not the channel 6 (second subscription package).

The invention has been described in detail with particular reference to the preferred embodiment thereof. It should be however understood that variations and modifications can be produced within the scope and the spirit of the present invention.

REFERENCES

[1] A. Fiat and M. Naor, "Broadcast encryption", CRYPTO'93, Lecture Notes in Computer Science 773, pp. 480491, Springer-Verlag, 1994.

[2] A. Sahai and B. Waters. Fuzzy identity-based encryption. In Advances in Cryptology—EUROCRYPT 2005, 24th Annual International Conference on the Theory and Applications of Cryptographic Techniques, Aarhus, Denmark, pages 457-473, 2005.

[3] J. Bethencourt, A. Sahai, and B. Waters. Ciphertext-policy attribute-based encryption. In 2007 IEEE Symposium on Security and Privacy (S&P 2007), 20-23 May 2007, Oakland, Calif., USA, pages 321-334, 2007.

[4] B. Waters. Ciphertext-policy attribute-based encryption: An expressive, efficient, and provably secure realization. http://eprint.iacr.org/2008/290.pdf, 2008. Unpublished manuscript.

[5] D. Lubicz and T. Sirvent. Attribute-based broadcast encryption scheme made efficient. In S. Vaudenay et al., editor, Proc. of Advances in Cryptology—Africacrypt'08, volume 5023 of LNCS, pages 325-342. Springer-Verlag, 2008.

[6] N. Attrapadung and H. Imai. Conjunctive broadcast and attribute-based encryption. In Pairing-Based Cryptography—Pairing 2009, Third International Conference, Palo Alto, Calif., USA, Aug. 12-14, 2009, pages 248-265, 2009.

[7] V. Miller. Short program for functions on curves. http://crypto.stanford.edu/miller/miller.pdf, 1986. Unpublished manuscript.

[8] P. Barreto, H. Kim, B. Lynn, M. Scott. Efficient Algorithms for Pairing-Based Cryptosystems. In Advances in Cryptology—CRYPTO 2002, 22$^{nd}$ Annual International Cryptology Conference, pages 354-368, London, UK, 2002. Springer-Verlag.

The invention claimed is:

1. A method for providing attribute-based encryption of a message using conjunctive normal form (CNF) expressions, the said CNF expression comprising at least one clause over a set of n attributes, the said method using a key generation engine, an encryption engine and a decryption engine, and comprising the steps of:

a. generating by the key generation engine a random $g \in G$, where G is a prime order group of order p where p is a primer number, four random values $\alpha, \gamma, \beta, r \in_R Z/pZ$, and for $i=1,2,\ldots,n,n+2,\ldots,2n$ where n is the number of attributes, computing by the key generation engine at least $2n-1$ values $g_i = g^{\alpha^i} \in G$ and at least one value $v = g^\gamma \in G$;

b. generating by the encryption engine an encryption key $PK=(g^r, g_1^r, \ldots, g_n^r, g_{n+2}^r, \ldots, g_{2n}^r, v^r, g_n^\beta, g_n)$ comprising at least $2n+2$ group elements;

c. for an abovementioned CNF expression over a set of attributes, CNF expression comprising N clauses, generating by the encryption engine N random values $t_1, t_2, \ldots, t_N \in_R Z/pZ$, computing by the encryption engine the value $$t = \sum_{i=1}^{N} t_i \bmod p,$$

generating by the encryption engine a cryptogram $hdr=(g_n^t, hdr_1, \ldots, hdr_N)$ consisting of at least $2N+1$ group elements and generating a session key SK, wherein the said session key or parts thereof is used to derive a symmetric key which is used to encrypt the message, or to encrypt the message with the said session key;

d. generating by the key generation engine a plurality of private decryption keys $dk_u = (g_1^{r(\beta+s_u)}, g_1^{s_u}, \ldots, g_n^{s_u}, g_{n+2}^{s_u}, \ldots, g_{2n}^{s_u}, d_{i_1}, \ldots, d_{i_N}, d_{j_1}, \ldots, d_{j_R})$ each of the said decryption keys explicitly associated with at least one positive attribute by the mean of the group element $d_{i_j} = g_{i_j}^{\gamma \cdot s_u}$ and explicitly associated with at least one negative attribute by the means of the group element $d_{j_k} = g_{j_k}^{\gamma \cdot s_u}$ wherein the value $s_u$ is a random group element and is unique for every decryption key $dk_u$.

2. The method according to claim 1 wherein the part $hdr_i$ of the cryptogram is generated by the encryption engine as $$hdr_i = \left(g^{rt_i}, \left(v^r \prod_{j \in \beta_i} g_{n+1-j}^r\right)^{t_i}\right)$$

comprising two group elements for every clause $\beta_i$ in the abovementioned CNF expression over a set of attributes.

3. The method according to claim 1 wherein the session key SK is computed by the encryption engine using a bilinear map as $SK=e(g_1^r, g_n^\beta)^t=e(g,g)^{\beta r \alpha^{(n+1)} t}$.

4. The method according to claim 1 further comprising providing the decryption engine with the decryption key $dk_u$ associated with at least one positive and one negative attribute, providing the decryption engine with the cryptogram $hdr=(hdr_0, hdr_{1,0}, hdr_{1,1}, \ldots, hdr_{N,0}, hdr_{N,1})$ consisting of at least $2N+1$ group elements, and providing the decryption engine with the conjunctive normal form (CNF) expression over a set of attributes of N clauses corresponding to the said cryptogram.

5. The method according to claim 1 further comprising computing for each of N clauses by the decryption engine the intermediate values $$SK_i^{S_u} = \frac{e(g_k^{S_u}, hdr_{i,1})}{e\left(d_k \cdot \sum_{j \in \beta_i, j \neq k} g_{n+1-j+k}^{S_u}, hdr_{i,0}\right)},$$

wherein $d_k$ is explicitly associated with an attribute present in the said clause.

6. The method according to claim 4 further comprising computing for each of N clauses by the decryption engine the intermediate values $$SK_i^{S_u} = \frac{e(g_k^{S_u}, hdr_{i,1})}{e\left(d_k \cdot \sum_{j \in \beta_i, j \neq k} g_{n+1-j+k}^{S_u}, hdr_{i,0}\right)},$$

wherein $d_k$ is explicitly associated with an attribute present in the said clause.

7. The method according to claim 5 wherein the said intermediate values are computed using bilinear maps.

8. The method according to claim 5 further comprising computing by the decryption engine the value of the session key $$SK = \frac{e(hdr_0, g_1^{r(\beta+S_u)})}{\prod_{i=1}^{N} SK_i^{S_u}}.$$

9. The method according to claim 7 further comprising computing by the decryption engine the value of the session key $$SK = \frac{e(hdr_0, g_1^{r(\beta+S_u)})}{\prod_{i=1}^{N} SK_i^{S_u}}.$$

10. The method according to claim 1 further comprising using the session key or parts thereof to derive a symmetric key to decrypt the message, or to decrypt the message with said session key.

11. The method according to claim 1 wherein the said session key SK is computed using a bilinear map.

12. A device for implementing the method of any of claims 1 to 11.

* * * * *